C. D. PETTIS.
BRAKE SHOE.
APPLICATION FILED FEB. 13, 1913.
1,065,720.
Patented June 24, 1913.
2 SHEETS—SHEET 2.
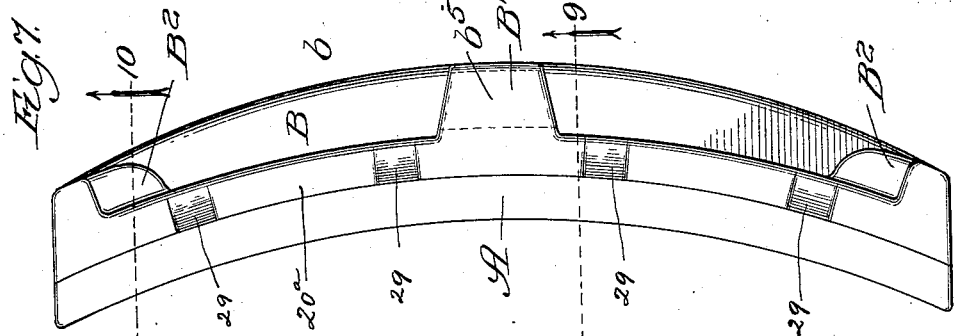
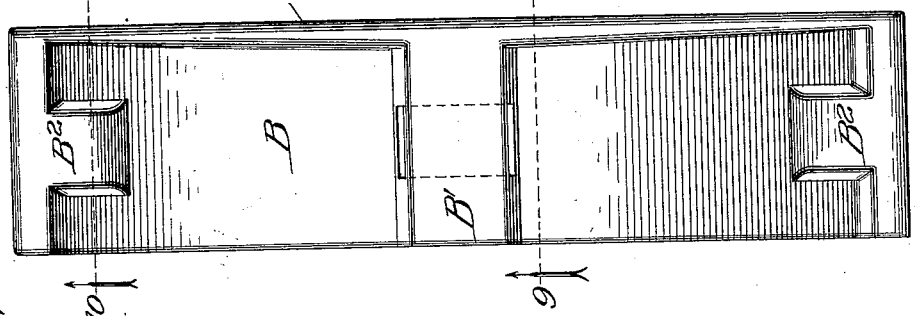
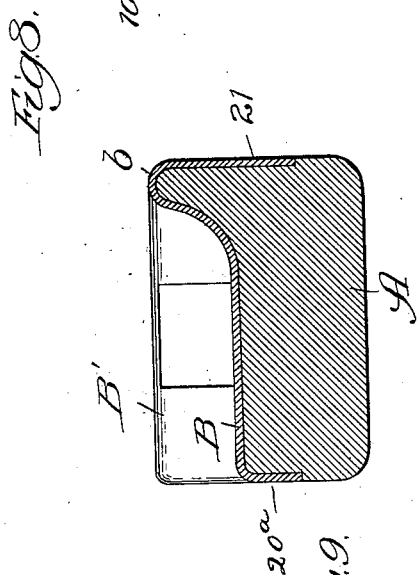
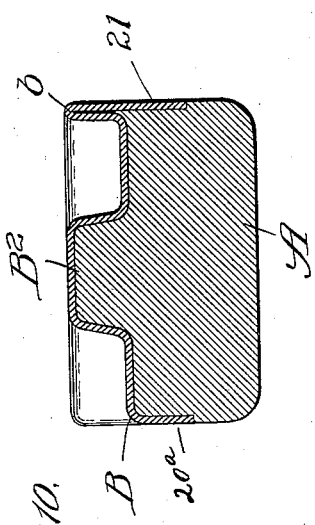

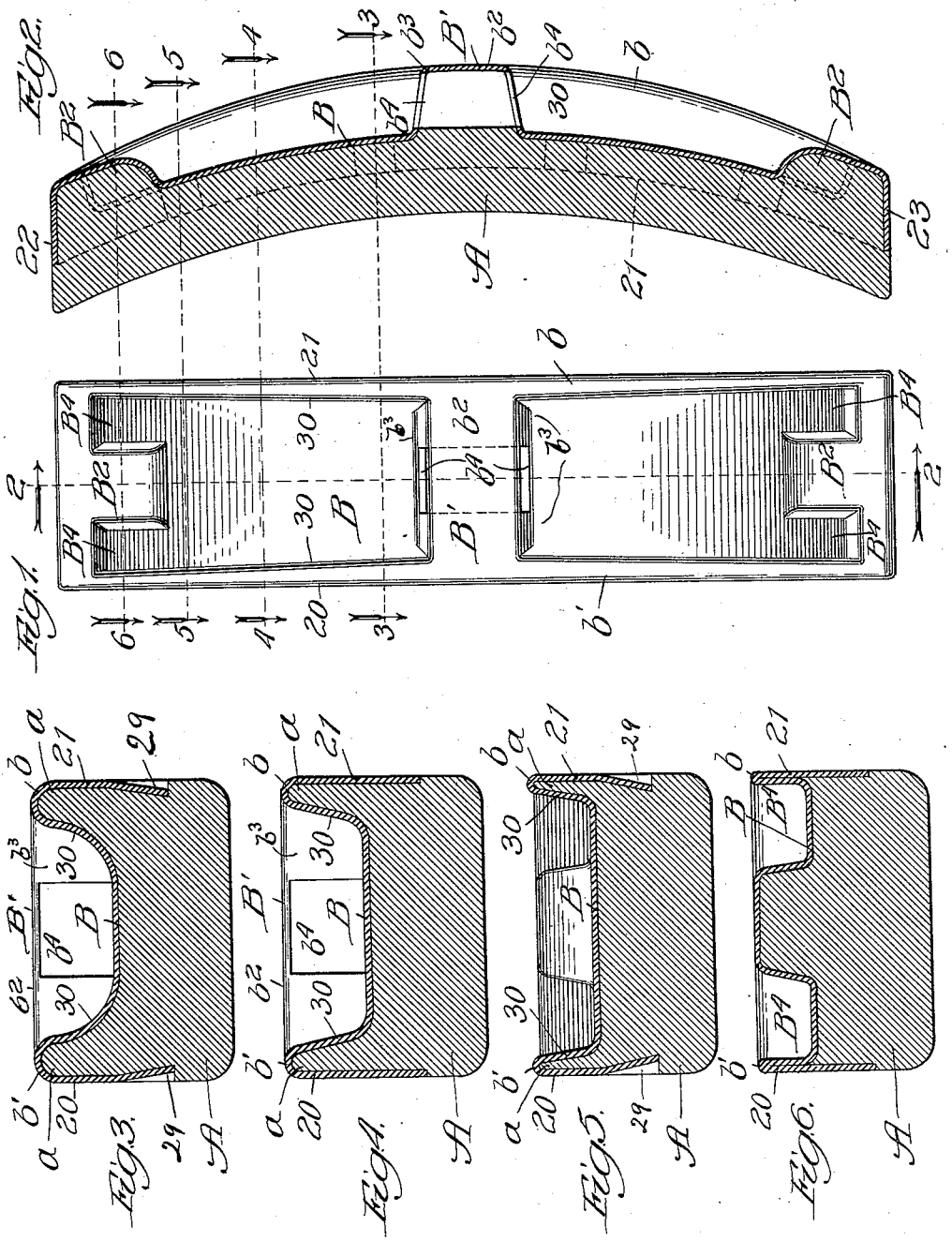

UNITED STATES PATENT OFFICE.

CLIFTON D. PETTIS, OF CHICAGO, ILLINOIS.

BRAKE-SHOE.

1,065,720.  Specification of Letters Patent.  Patented June 24, 1913.

Application filed February 13, 1913. Serial No. 748,258.

*To all whom it may concern:*

Be it known that I, CLIFTON D. PETTIS, a citizen of the United States, residing at the city of Chicago, county of Cook, and State of Illinois, have invented certain new and useful Improvements in Brake-Shoes, of which I do declare the following to be a full, clear, and exact description, reference being had to the accompanying drawings, forming part of this specification.

The present invention has relation to that class of railway brake shoes commonly known as reinforced shoes, in which provision is made for strengthening the shoe so that as it becomes reduced by wear, the danger of the breaking of the shoe and the falling away of its parts may be avoided. An example of this type of brake shoe is illustrated in an application for Letters Patent filed by me in the Patent Office August 3, 1912, Serial No. 713,175.

The present invention consists in the features of novelty hereinafter described, illustrated in the accompanying drawings and particularly pointed out in the claims at the end of this specification.

Figure 1 is a plan view of a brake shoe embodying my invention. Fig. 2 is a view in longitudinal section on line 2—2 of Fig. 1. Fig. 3 is a view in cross section on line 3—3 of Fig. 1. Fig. 4 is a view in cross section on line 4—4 of Fig. 1. Fig. 5 is a view in cross section on line 5—5 of Fig. 1. Fig. 6 is a cross section on line 6—6 of Fig. 1. Fig. 7 is a view in side elevation showing a modified form of the invention. Fig. 8 is a plan view of the structure shown in Fig. 7. Fig. 9 is a view in cross section on line 9—9 of Figs. 7 and 8. Fig. 10 is a view in cross section on line 10—10 of Figs. 7 and 8.

In the accompanying drawings my invention is shown as applied to one type only of brake shoes, such as are commonly used in freight and passenger car service, but it will be understood that the invention is applicable also to other types of brake shoes. It will be understood also that while I have illustrated what I regard as the preferred embodiment of my invention, the precise details hereinafter set forth may be varied within wide limits without departing from the spirit of the invention, and features of the invention may be employed without its adoption as an entirety.

The body portion A of the brake shoe is preferably formed of cast metal that will be united to a back B, preferably of ductile metal, in the casting operation. As shown, the back B is in the shape of a pan or shell and is formed from a comparatively thin plate of metal that is stamped or pressed to form integral therewith the sides 20 and 21 and the ends 22 and 23 that extend somewhat below the plane of the back of the shoe body A.

In the form of the invention shown on Sheet 1 of the drawings, both of the side edge portions of the back B are raised to form ribs $b$ and $b'$ that extend lengthwise of the back. In making the ribs $b$ and $b'$ the side edge portions of the back are forced outwardly to form the walls 30 and reverted or bent inwardly to form the side walls 20 and 21. Preferably, a space is formed between the walls 30 and the side walls 20 and 21 into which the material of the shoe body A will enter in the casting operation. The hollow, longitudinal ribs $b$ and $b'$ thus formed at the side edges of the back of the shoe not only serve to very greatly strengthen the back of the shoe, but also, in the preferred form of the invention, serve as chambers to receive the longitudinal ribs $a$ of cast metal of which the shoe body A is formed, these ribs $a$ thus serving, in turn, to give increased strength to the back B.

By reference to the cross sectional views, Figs. 3 to 6, it will be seen that the chambered or hollow ribs $b$ and $b'$ are somewhat broader about the central portion of the shoe than adjacent its ends, and that the raised ribs $a$ of the shoe body are of correspondingly varied thickness; and it will be seen also, by reference to Fig. 2, that the height of the ribs $b$ and $b'$ is somewhat greater adjacent the central portion of the shoe and tapered thence to the ends. The purpose of this arrangement is, to give the greatest strength or reinforcement to the central portion of the shoe that will be subjected to the greatest strains in service.

In the preferred form of my invention, the center lug B' of the shoe is formed as an integral part of the back, as are also the end lugs B². The center lug B' comprises a crown $b^2$ and side walls $b^3$ that extend between the ribs $b$ and $b'$ of the back of the shoe; and through the side walls $b^3$ are formed openings $b^4$ to receive the wedge or key whereby the shoe will be connected in usual manner to the brake head. The raised end lugs B² will extend partially across the ends of the back B, leaving spaces B⁴ at each side thereof to receive the ends of the brake head.

From the foregoing description it will be seen that when the back of the shoe is placed in the mold and metal of the body portion A is cast therein, such cast metal will run into the hollow ribs b and b' and into the end lugs B², thereby materially strengthening these parts. It will be understood, of course, that a core will be placed in the mold, so as to form a channel between the openings b⁴ in the center lug, it being understood that the cast metal will extend between the walls b³ of the center lug at each side of the openings b⁴ thereof.

It will be observed that the walls 30 of the ribs b and b' at each side of the center lug B' are inclined and curved inwardly and downwardly from top to bottom. This is a novel and very advantageous feature in brake shoes, even regardless of the particular reinforcement of the shoe, because these curved walls afford a snug bearing against the curved portions of the standard brake head of the Master Car Builders' Association and thus materially aid the shoe in resisting strains. So far as I am aware, this feature of providing a brake shoe with such raised side ribs adjacent the center lug is broadly new.

To more effectively retain the back B in union with the metal body A of the shoe, the side walls 20 and 21 of the back are inwardly offset or indented at intervals and adjacent their lower edges to form integral ribs on their inner surfaces and interlock with the cast metal body. It should be further noted that the working face of the shoe is preferably provided with rounded side edges to properly fit the wheel flanges, and the edges of the side and end walls of the back terminate short of the rounded edges.

In Figs. 7 to 10 of the drawings, I have shown my invention as applied to a brake shoe in which one side only of the back is provided with a raised longitudinal rib. In this form of the invention the back B is formed with the longitudinal rib b and end lugs B², as in the construction hereinbefore described. Inasmuch as the longitudinal rib at the opposite side of the shoe is omitted, the back will be formed at such side with a downwardly turned edge or side wall 20ª which will extend some distance below the plane of the back of the shoe. The center lug B' will be the same in this form of the invention as in that hereinbefore described, except that that part of the center lug farthest from the rib b will be formed with an end wall b⁵ that will merge into the side wall 20ª of the back. It will be seen that, whether one or more longitudinal ribs are employed, they will effectively serve to strengthen the shoe.

Having thus described my invention, what I claim as new, and desire to secure by Letters Patent, is:—

1. A brake shoe comprising a back of ductile metal having one at least of its side edges raised and reverted to form a rib extending lengthwise of the shoe.

2. A brake shoe comprising a back of ductile metal having one at least of its side edges raised and reverted to form a rib extending lengthwise of the shoe, said rib tapering from its central position to its ends.

3. A brake shoe comprising a body and a back of ductile metal having one at least of its side edges raised and reverted to form a hollow rib extending lengthwise of the shoe, the body of the shoe being provided with a raised, longitudinal rib extending into said hollow rib of the back.

4. A brake shoe comprising a cast metal body and a ductile metal back united thereto in the casting operation, one at least of the side edges of said back being raised and reverted to form a hollow rib extending lengthwise of the shoe, the back of the body of the shoe being formed with a rib filling the hollow rib of the back.

5. A brake shoe comprising a body and a back of ductile metal having one at least of its side edges raised and reverted to form a rib extending lengthwise of the shoe, said reverted edge extending below the plane of the back of the shoe.

6. A brake shoe comprising a back of ductile metal with integral side and end walls, one at least of the side edges of the back being raised and reverted to form a rib extending lengthwise of the shoe.

7. A brake shoe comprising a back of ductile metal having both its side edges raised and reverted to form ribs extending lengthwise of the shoe.

8. A brake shoe comprising a back of ductile metal having one at least of its side edges raised and reverted to form a rib extending lengthwise of the shoe, said rib being shallower about the ends than about the central portion of the shoe.

9. A brake shoe comprising a cast metal body and a back of ductile metal, having its side edges raised and reverted to form hollow ribs extending lengthwise of the shoe, the body of the shoe being formed with integral ribs extending into said hollow ribs of the back.

10. A brake shoe comprising a back of ductile metal having one at least of its side edges raised and reverted to form a rib extending lengthwise of the shoe, and having a raised, central lug integral with said rib.

11. A brake shoe comprising a back of ductile metal having its side edges raised and reverted to form ribs extending lengthwise of the shoe and a raised center lug extending between and connecting said raised ribs.

12. A brake shoe comprising a back of ductile metal having one at least of its side edges raised and reverted to form a rib extending lengthwise of the shoe and having raised end lugs.

13. A brake shoe comprising a back of ductile metal having its opposite side edges raised and reverted to form ribs extending lengthwise of the shoe and having a raised central lug extending between said ribs and raised end lugs located between the ends of said ribs.

14. A brake shoe comprising a body and a back of ductile metal having side and end walls extending to a point between the back and wearing face of said body and having one at least of its side edges raised and reverted to form a rib extending lengthwise of the shoe.

15. A brake shoe having a center lug and having a raised rib adjacent the side of the center lug, said raised rib having a downwardly and inwardly inclined wall to engage the side of the brake head.

16. A brake shoe having a center lug and raised longitudinal ribs at the opposite ends of said center lug, said raised ribs having downwardly and inwardly curved inner walls adapted to engage the sides of the brake head.

17. A brake shoe comprising a center lug and raised ribs at the opposite ends of said center lug, said raised ribs having downwardly and inwardly extending walls adapted to engage the sides of the brake head.

18. A brake shoe comprising a cast metal body and a back of ductile metal, the latter having one at least of its side edges raised and reverted to form a rib extending lengthwise of the shoe, the outer wall of said rib being in line with the side face of the shoe and the inner wall thereof being downwardly and inwardly inclined and adapted to engage the correspondingly shaped side of the brake head.

19. A brake shoe having a center lug and raised, longitudinal, side ribs on its back, the outer walls of said side ribs being in line with the side walls of said shoe and the inner walls thereof being downwardly and inwardly inclined and adapted to engage the sides of the brake head.

20. A brake shoe comprising a cast metal body and a back of ductile metal having its side edges raised and reverted to form side ribs extending lengthwise at the back of the shoe, said reverted edges extending below the plane of the back of the shoe and said ribs having outer walls in the planes of the side walls of said shoe and inwardly inclined walls adapted to engage the sides of the brake head.

21. A brake shoe comprising a cast metal body and a pan-shaped back of ductile metal united to said body in the casting operation and having integral side and end walls surrounding said body and terminating above the initial wearing face of the shoe, the side walls of said back being provided at intervals with inwardly indented or offset portions forming integral ribs on their inner surfaces to interlock with said body, substantially as described.

CLIFTON D. PETTIS.

Witnesses:
ELEANOR HAGERNOW,
KATHERINE GERLACH.

Copies of this patent may be obtained for five cents each, by addressing the "Commissioner of Patents, Washington, D. C."